Nov. 24, 1959 G. H. FUEHRER 2,914,031
TELESCOPIC FEED LEG ASSEMBLY
Filed Jan. 21, 1958
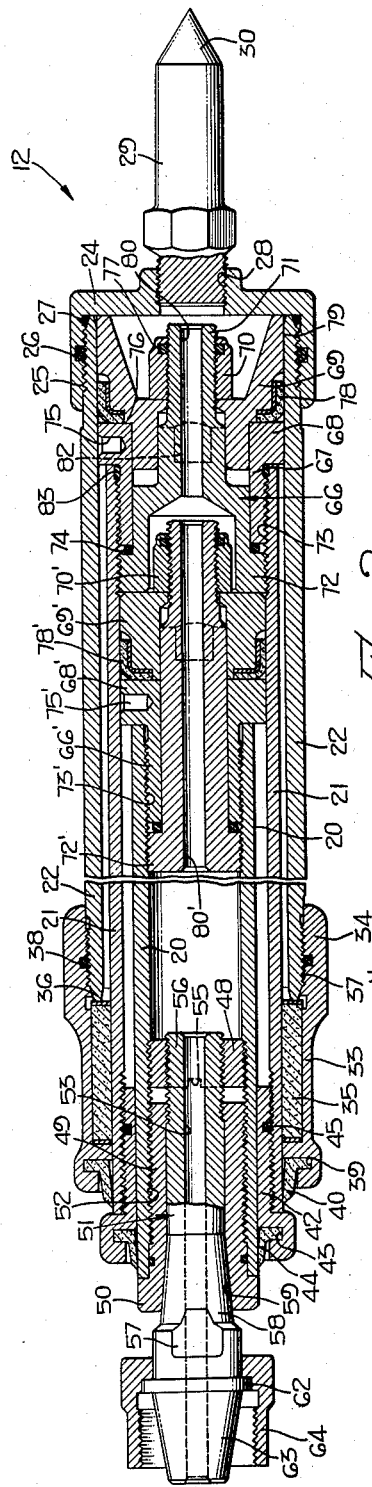
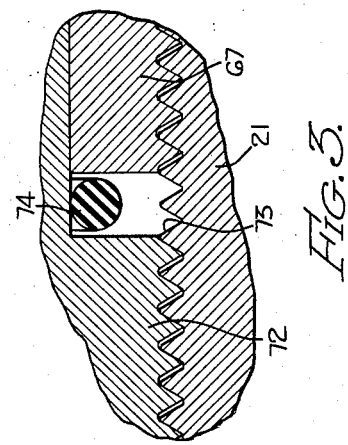
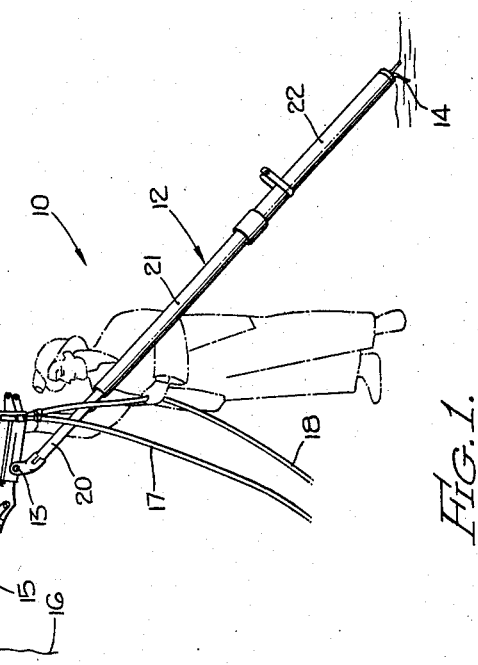
GEORGE H. FUEHRER,
INVENTOR.
BY
ATTORNEY ent Office 2,914,031
Patented Nov. 24, 1959

2,914,031

TELESCOPIC FEED LEG ASSEMBLY

George H. Fuehrer, Downey, Calif., assignor to Thor Power Tool Company, Aurora, Ill., a corporation of Delaware Application January 21, 1958, Serial No. 710,266

11 Claims. (Cl. 121—9)

This invention relates to push feed drill assemblies of the type including a sinker type rock drill supported by a telescopic feed leg and operable to advance the rock drill into material being drilled automatically as the drilling proceeds.

In push feed drills of the type referred to above, a percussive type sinker drill assembly is pivotally supported on the upper end of a telescopic feed leg extending downwardly in an inclined position with its lower end anchored in the ground. The percussive action of the drill imparts severe vibrations to the feed leg creating difficult problems in maintaining the separable threaded connections of the leg tightly and rigidly secured together. As a result, the several sub-assemblies and particularly those internally of the housing frequently loosen and separate causing collapse of the leg with serious consequences to the equipment and to the crew. Many efforts made to provide joint structures not subject to loosening and the consequences which follow have met with indifferent success. Up to the present invention, no prior construction has been found which is sufficiently reliable and satisfactory and which retains the desired ease of separability for maintenance purposes.

Accordingly, it is a primary object of the present invention to provide a telescoping leg assembly obviating the shortcomings of prior constructions while providing for ease of disassembly and reassembly of the structure in the field with simple tools. These results are achieved by providing a special vibration-proof joint assembly at the inner end and preferably both ends of the telescoping tubular members. These assemblies comprise closure devices for the tubes such as the external connection between the leg and the percussive tool assembly and the internal connection between the tubes and the piston heads therefor. Owing to the use of the special closure devices provided by this invention certain essential threaded connections are loaded to an optimum stress point and in such manner that subsequent loosening due to shock and vibration occurs with extreme rarity.

Essentially the closure devices feature a deep threaded well at one or both ends of the tubular members and to the bottom of which is assembled a threaded member of relatively short axial extent. A bushing is then screwed into the outer end of the well until its radially flanged outer end seats firmly against the end of the tube with its inner end out of contact with the first threaded member. Thereafter, a threaded connecter is assembled between the outer end of the bushing and the center of the inner threaded member, this connecter being tightened in a manner to place the threads on the inner member under high load stress while simultaneously pressing the flange of the bushing rigidly against the end of the tube. This assembly is found to be highly resistant to loosening under vibration and shock load conditions conducive to the loosening of conventional lock nut assemblies.

Accordingly, it is a primary object of the present invention to provide a telescopic pneumatic leg assembly for use in supporting percussive tools and featuring assembly connections highly resistant to loosening under vibration and shock operating conditions.

Another object of the invention is the provision of a feed leg comprising a plurality of telescopically assembled tubes and wherein the piston head assemblies thereof are held locked to the inner ends of the tubes by vibration-proof threaded connecter assemblies of novel construction.

Another object of the invention is the provision of a pneumatic feed leg assembly having numerous threaded joints featuring vibration-proof connecters.

Another object of the invention is the provision of a threaded fastener assembly for securing parts to the end of thin-walled tubes subject to vibration and shock loads and in a manner highly resistant to loosening.

These and other more specific objects will appear upon reading the following specification and claims and upon considering in connection therewith the attached drawing to which they relate.

Referring now to the drawing in which a preferred embodiment of the invention is illustrated.

Figure 1 is a side elevational view of a push feed drill assembly in a typical operating position;

Figure 2 is a longitudinal sectional view through the feed leg assembly component of the drill on an enlarged scale; and Figure 3 is a fragmentary sectional view through a portion of the vibration-proof joint showing the parts on an enlarged scale.

Referring now to Figures 1 to 3, there is shown a push feed drill assembly 10 comprising a pneumatically driven percussive drill designated generally 11 and a telescopic feed leg designated generally 12, the latter being pivotally connected to the drill through a pivoting joint 13 near the latter's center of gravity. The lower end of the feed leg preferably is provided with a spur or foot 14 appropriately disposed to make firm supporting contact with the floor of the mine shaft wherein the work is to be performed. Suitably chucked within the forward end of percussive tool 11 is a drill steel 15 having its outer end bearing against the bore face or other material being drilled. Connected to the main body of the tool is a flexible hose 17 for supplying air under suitable pressure for operating the tool in the usual manner. Also, connected with the drill under normal operating conditions is a flushing water line 18 through which water can be supplied for flow through hollow drill steel 15 for delivery at its tip to flush away cuttings as they are produced.

Referring now to Figure 2, the constructional details of the feed leg assembly are seen to comprise a plurality of telescopically arranged tubular members including an inner tube 20, an intermediate tube 21 and an outer tube or housing 22. The opposite ends of tubes 20 and 21 are provided with threaded wells whereas outer tube 22 is threaded externally at its ends. The lower end of tube 22 is provided with an end cap 24 having a snug threaded fit over threads 25. A fluid tight seal is assured by a sealing gasket or O-ring 26 seated in an inwardly opening groove intermediate the opposite ends of its threaded portion. Desirably, a supplemental sealing gasket 27 is provided in the inner corner of end cap 24 and is compressed against the tapered end of tube 22 in the manner made clear by Figure 2.

Threadedly seated in an axial bore 28 of end cap 24 is a solid stud 29 having a pointed end 30 of hardened steel or the like adapted to provide an anti-skid support for the lower end of the feed leg assembly. The latter may be augmented by a spur 14 projecting laterally from the base of stud 29.

The opposite end of main housing tube 22 is provided with a packing assembly or end cap 33 having an internally threaded skirt 34 formed with an annular recess seating suitable packing 35 adapted to form a sliding air-tight seal between its inner cylindrical surface and the juxtaposed surface of tubular member 21. This packing is held compressed between the end wall of cap 33 and end 36 of tube 22 by means of mating threads 37. Interposed between threads 37 is a sealing gasket such as O-ring 38 supported in an annular groove formed intermediate the ends of the threads in sleeve 34. The exterior end of cap 33 is provided with channel 39 in which is seated the radial flange of a wiper gasket and dust ring having a lip 40 bearing against the polished exterior of tube 21.

The adjacent or outer end of intermediate tube 21 is threaded and fitted with a bushing 42 having a channel 43 seating a dust guard ring 44 having its resilient lip bearing against the polished exterior of inner tube 20. Seated within a channel encircling the threaded portion of bushing 42 is a sealing gasket or O-ring 45 to prevent leakage of fluid from the interior of the leg outwardly along the threaded connection.

A vibration-proof closure assembly for the outer end of inner tube 20 is illustrated at the left-hand end of Figure 2 and constitutes an important feature of the invention. The closure includes as its three principal parts an inner threaded ring 48, a bushing 49 having a radially flanged collar 50 at its outer end and a connector assembly 51 serving to lock sleeve 48 and bushing 50 against disassembly with respect to the threaded well 52 provided at the outer end of tube 20. Connector 51 is provided with an open-ended axial passage 53 for supplying pressurized fluid to the interior of feed leg assembly 12. Sleeve 48 is threaded both internally and externally and is provided with notches 55 across one end for seating a wrench used in assembling the sleeve into threaded well 52. The internal threads of sleeve 48 seat the threaded end 56 of connector 51. In this connection it is pointed out that the external threads of sleeve 48 have a very snug running fit with the threads of well 52 to the end that the turning of connector 51 by the aid of flats 57 on the opposite sides of the exposed outer ends of the connector does not operate to turn sleeve 48 within well 52.

It will also be understood that the shank portion of connecter 51 has smooth side walls fitting loosely within the bore of bushing 49. The outer end of connector 51 has a tapering shank portion 58 closely fittting and seating within the complementarily shaped socket 59 formed at the outer end of the passage through bushing 49. As a consequence, the clockwise rotation of connector 49 is effective through threaded end 56 and through the cooperating threaded sleeve 48 to place the shank of the connector under high axial tension and to press the inner radial face of bushing flange 50 against the end of tube 20. At the same time, ring 48 is placed in axial compression with the result that its external threads and the cooperating threads at the inner end of well 52 are highly stressed and frictionally locked against relative rotation or loosening despite extreme vibratory conditions emanating from the percussive tool connected directly thereto.

The outer end of connector 51 is provided with a radial flange 62 opposite the larger end of a flaring socket 63. Flange 62 serves as a retainer for an assembly nut 64 which will be understood to screw over the threaded shank of a member forming part of the pivot connection 13 for percussive tool assembly 11. Hence, the tightening of retainer nut 64 locks the converging socket 63 seated in fluid tight relation to pivot connection 13 pointed out as having a flexible fluid passage connection with the interior of tool 11. In this manner, air under pressure is supplied from the interior of tool 11 and conducted through passage 53 of the connector into the interior of the expansible feed leg assembly 12.

Referring now to the inner or the right hand ends of the tubular members making up the feed leg assembly, it will be seen that the closure devices provided for each of tubes 20 and 21 embody the same vibration-proof, detachable connector features described above in connection with the outer end of tube 20. The principal difference between the two closure assemblies resides in the fact that the internal closures include piston means for guiding the tubes along the interior of the assembly and forming fluid tight seals therewith. Each of the closure assemblies is constructed in the same general manner but differ essentially in size.

The closure assembly for the inner end of intermediate tube 21 includes a mushroom-shaped connector 66, a bushing 67 having a radial flange 68, a piston head ring 69 and a shake proof nut 70 seated over the threaded stem-end 71 of connector 66. The externally threaded rim 72 of connector 66 has a very snug running fit with the threaded interior walls of a well 73 formed axially of the inner end of tube 21. The threaded sleeve of bushing 66 seats within the outer portion of well 73 with its inner end terminating short of head portion 72 on connector 66. It is important that the radial end of the bushing not contact the juxtaposed radial face of connector head 62. To this end, a resilient bumper ring, such as an O-ring 74, is interposed. This ring serves no sealing purpose but does provide an effective bumper preventing metal-to-metal contact found to be so harmful in transmitting vibrations and in loosening threaded connections within well 73.

The rim of flange 68 may be provided with one or more openings 75 for seating the prong of a wrench used in the assembly and disassembly of the bushing relative to the well. Piston ring 69 is shaped as shown and seats with a close sliding fit into the outer end of bushing 67 and has a snug fit with the enlarged shank of connector 66. The exterior of the piston ring is provided with a shoulder 76 seating firmly against the end face of bushing flange 68 against which it is clamped by the tightening of lock nut 70. The latter is preferably provided with a fiber ring 77 of known character cooperating with the threaded stem 71 of the connector to prevent the loosening of the nut once it is run down on the threaded stem. Piston ring 69 is also provided with an outwardly opening annular channel in which is clamped a resilient sealing ring 78 and its cylindrical portion 79 has a close sliding fit with the polished internal wall of tube 22. It will be noted that a fluid passageway 80 extends axially through connector 66 and supplies pressurized fluid received from the interior of tube 20 to the lower end of outer housing 22.

In view of the substantial identity between the components of the closure assembly for the inner end of tube 20 and those just described for tube 21, it is thought unnecessary to repeat the description in connection with the similar closure assembly for the inner end of tube 20 other than to say the corresponding parts of each are designated with the same numerals described above but distinguished by the addition of a prime.

The assembly of the closure means for the opposite ends of the tubular members of leg assembly 12 is important and is carried out in the following manner, reference being had to a typical one of these such as that of the inner end of tube 21. The first operation consists in threading connector 66 into well 73 making use of the flats 82 provided on the diametrically opposed faces of the connector stem or shank. Owing to the tight fit between the threads on the rim connector head 72 and those of well 73, a wrench must be used throughout the assembly operation, care being taken to turn the connector until it is substantially fully seated at the bottom of well 73. A sealing gasket 83 is seated in a groove therefor about the base of bushing 67 and the latter is threaded into the outer end of well 73 until radial flange 68 is tightened as snugly as possible against the end of tube 21. Resilient ring 74 interposed between connector head 72 and the inner end of bushing 67 may or may not be compressed to a slight extent as the bushing is fully tightened and serves the purpose mentioned above. The piston head unit including packing ring 78 is then assembled over the exposed end of the connector shank and lock nut 70 is screwed down as tightly as possible thereby pressing shoulder 76 of the piston ring against the outer end of bushing 67. This operation places the threads on head 72 under high stress to a high degree thereby providing a shake proof frictional lock with the cooperating threads of well 73. The high joint loading of the well threads and of those on connector head 72 is facilitated by the thin walled nature of the inner end of tube 21 and the small number of threads on head 72. In consequence, it is found that the described closure assembly may be operated over long periods under extreme vibration conditions without any tendency to loosen. This is equally true of the closure assembly described for the outer end of tube 20 despite its direct connection with the source of vibration from percussive tool 11.

The assembly and operation of the described push feed drill will be readily apparent from the foregoing detailed description of its components. The percussive tool is assembled to feed leg assembly 12 simply by tightening the mounting and retainer ring 64 of the latter assembly to the pivot connector 13 of the tool. The assembly is then erected in the position generally indicated in Figure 1 and the pressurized air line 17 and flushing water line 18 are connected to couplings therefor provided on tool 11. The air line not only supplies the necessary fluid to operate the tool but maintains a supply of pressurized air to the feed leg assembly by way of passage 53 in connector 51. This air pressure acts against the piston heads to extend tubes 20 and 21 as necessary to maintain the tool and its drill steel 15 pressed against the rock face 16 being drilled.

While the particular telescopic feed leg with vibration-proof closure assemblies herein shown and disclosed in detail is fully capable of attaining the objects and providing the advantages hereinbefore stated, it is to be understood that it is merely illustrative of the presently preferred embodiments of the invention and that no limitations are intended to the details of construction or design herein show other than as defined in the appended claims.

I claim:

1. A telescopic feed leg assembly for use in feeding a push feed drill supported thereby into material being drilled under fluid pressure, said leg assembly including a plurality of telescopically arranged tubes extendable axially under internal fluid pressure, piston means detachably secured to the inner end of at least one of said tubes, vibration-proof fastener means for holding said means secured to the inner end of said one tube, said fastener means including a mushroom-shaped member having its threaded rim edge screwed into the inner end of said one tube until said rim edge is spaced inwardly of said inner end of the tube, said mushroom-shaped member having a threaded stem extending through said piston means and supporting a nut, said piston being threaded into the inner end of said one tube in an area spaced from the head of said mushroom-shaped member, said nut being effective to hold said piston means clamped rigidly against the end of said tube and to load said rim threads under high stress, and said mushroom head being out of metal-to-metal contact with the juxtaposed inner end of said piston means.

2. A feed leg assembly as defined in claim 1 characterized in the provision of a plurality of tubes telescopically arranged axially of a tubular housing, and in that the inner end of each of said tubes has piston head means each similarly held in shake proof assembled position thereon.

3. A feed leg assembly as defined in claim 2 characterized in the provision of resilient buffer means between the under side of said mushroom-shaped member and the juxtaposed face of said piston means thereby providing positive assurance against metal-to-metal contact of the adjacent radial faces of said member and of said piston means.

4. A feed leg assembly as defined in claim 1 characterized in that said piston means includes an annular encircling groove having mounted therein resilient sealing ring means.

5. A feed leg assembly as defined in claim 1 characterized in that said piston means comprises a plurality of concentrically arranged members cooperating to support an encircling resilient sealing ring therebetween.

6. A piston head assembly adapted to be mounted on the inner end of one of two telescopically assembled tubular members and to be clamped thereto in a shakeproof manner, said assembly including a circular head provided with an axially projecting stem threaded at its outer end, the rim of said head being threaded and adapted to be screwed into the bottom of a threaded well at the inner end of one of said tubular members, piston means seated over said stem and including a bushing threaded into the outer end of said well with its inner end terminating in axially spaced relation to said circular head, and lock nut means threaded over the exposed threaded end of said stem and serving to hold said piston means and said bushing rigidly assembled to the threaded side wall of the well in said tubular member.

7. A telescopic feed leg adapted for use in supporting and advancing sinker-type rock drills into material being drilled, said leg comprising a plurality of tubular members telescopically assembled, closure means adapted to be locked in assembled relation to the internally threaded wells at the opposite ends of one of said tubular members, said closure means each including a threaded annular member screwed into the inner ends of said threaded wells, a radially flanged bushing threaded into the outer portions of said threaded wells with the flange thereof pressed tightly against the juxtaposed end of said tubular member, and rigid threaded means rotatably interconnecting the outer end of said bushing and said threaded annular member operable when tightened to urge said bushing and said annular member toward one another axially of said threaded wells and thereby lock said threaded members assembled within each of said wells in a shakeproof, vibration-proof manner.

8. A feed leg as defined in claim 7 characterized in that each of said closure means has a fluid passage extending therethrough into the interior of said one tubular member.

9. A feed leg as defined in claim 7 characterized in that one of said closure means includes a piston head having a cylindrical surface co-axially of said one tubular member and adapted to have a close sliding fit with the interior side wall of another one of said tubular members.

10. A feed leg as defined in claim 9 characterized in that each of said closure means has a fluid passage extending therethrough, and coupling means at the exposed outer end of one of said passages for connecting the same to a source of pressurized fluid.

11. In a push feed drill assembly of the type including a percussive action sinker rock drill supported on an extensible telescopic feed leg for advancing the drill into material being drilled under fluid pressure, that improvement which comprises vibration-proof threaded fastener means for detachably connecting piston means to the inner end of a tube telescopically supported within a surrounding tube of said leg, said fastener including piston head means having a threaded connection with the inner end of said tube and provided with a flanged shoulder in direct contact with the tube end, and a mushroom shaped member having its threaded stem extending through said piston means and secured thereto by a shakeproof nut, the threaded rim of the head of said mushroom member being threadedly secured to the inner of said tube end with the threads thereof highly stressed by the tightening of said shakeproof nut and being free of metal-to-metal contact with said piston means axially of said leg assembly.

References Cited in the file of this patent

UNITED STATES PATENTS

| | | |
|---|---|---|
| 2,680,596 | Houston | May 8, 1954 |
| 2,689,547 | Pearson | Sept. 21, 1954 |